United States Patent [19]

Hauser

[11] 4,133,850

[45] Jan. 9, 1979

[54] APPARATUS IN A TANK FOR AERATING LIQUIDS WHICH TEND TO FROTH

[75] Inventor: Hans U. Hauser, Niederweningen, Switzerland

[73] Assignee: Bucher-Guyer AG, Maschinenfabrik, Niederweningen, Switzerland

[21] Appl. No.: 752,148

[22] Filed: Dec. 20, 1976

[30] Foreign Application Priority Data

Dec. 18, 1975 [DE] Fed. Rep. of Germany ....... 2557200

[51] Int. Cl.² .............................................. B01F 3/04
[52] U.S. Cl. ..................................... 261/93; 209/169; 210/219; 210/221 M; 210/242 A; 261/36 R; 261/120
[58] Field of Search ................... 261/87, 93, 120, 124, 261/36 R, 91; 209/169, 170; 210/221 M, 221 P, 242 A, 221 R, 219

[56] References Cited

U.S. PATENT DOCUMENTS

| | | | |
|---|---|---|---|
| 954,951 | 4/1910 | Furowicz | 261/93 |
| 2,240,671 | 5/1941 | Sborlino | 209/169 |
| 2,271,446 | 1/1942 | Unger, Jr. | 261/93 X |
| 2,406,532 | 8/1946 | Fahrenwald | 261/93 X |
| 2,530,814 | 11/1950 | DeBecze et al. | 261/93 |
| 3,630,498 | 12/1971 | Bielinski | 261/120 X |
| 3,797,809 | 3/1974 | Sydnor, Jr. | 261/120 X |
| 3,846,516 | 11/1974 | Carlson | 210/242 A X |
| 3,887,660 | 6/1975 | Romantschuk et al. | 210/242 A X |
| 3,953,554 | 4/1976 | Loughridge | 261/124 |
| 4,028,229 | 6/1977 | Dell | 209/169 X |
| 4,029,724 | 6/1977 | Muller et al. | 261/93 X |

FOREIGN PATENT DOCUMENTS

| | | | |
|---|---|---|---|
| 281144 | 6/1952 | Switzerland | 261/93 |
| 819785 | 9/1959 | United Kingdom | 261/93 |

*Primary Examiner*—Richard L. Chiesa
*Attorney, Agent, or Firm*—Holman & Stern

[57] ABSTRACT

The present invention relates to an apparatus for the controlling of froth during the aeration of liquids.

In the aeration (or treatment with gas) of sewage for the biological (or chemical) purification of the latter it is well known that considerable frothing occurs, which cannot be immediately controlled even with considerable effort and expense, for example using froth skimmers, froth barriers, oversize tanks, and the like. The problem is in providing an aeration apparatus which, without additional measures, that is to say by its own resources, is able to control frothing and thus keep it within permissible limits.

The expressions "aeration" and "air" are here used to refer to any gaseous medium which is to be admixed with any liquid concerned in the present context. Similarly the expression "air pipe" is to be understood as meaning a pipe for a gaseous medium. The following remarks therefore deal with a case of aeration not only for the sake of simplicity, but also because this is a frequent application of the apparatus described above. It is for the same reason that the aeration of sewage highly charged with organic substances, particularly from livestock establishments, will mainly be discussed.

14 Claims, 5 Drawing Figures

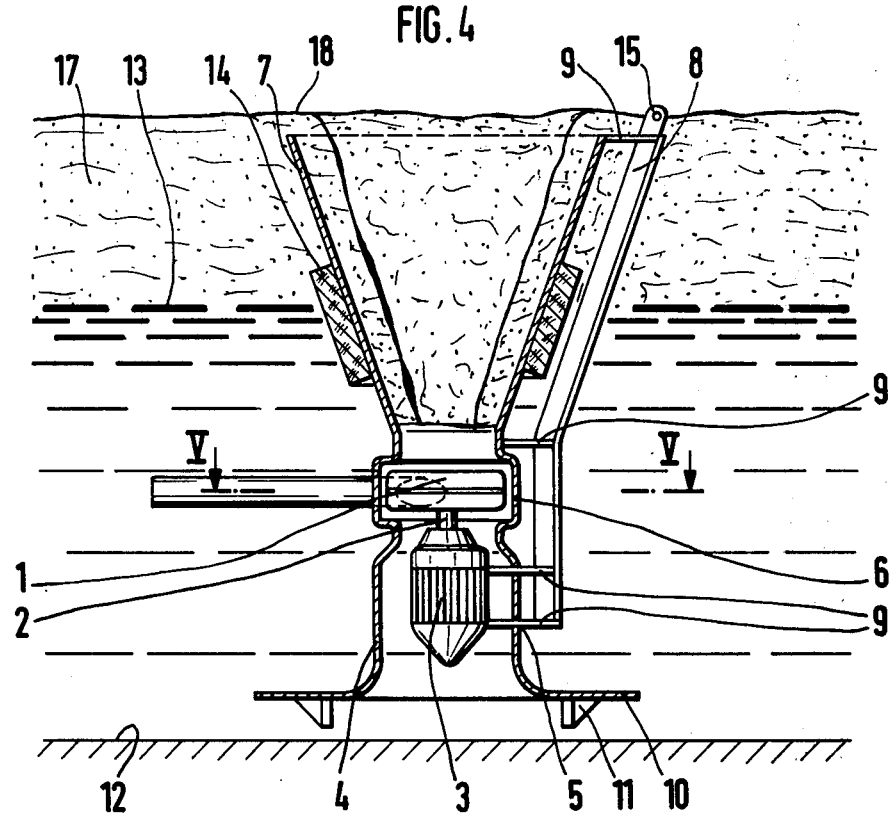
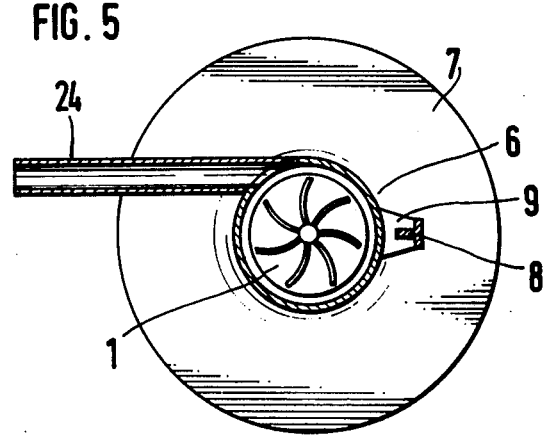

APPARATUS IN A TANK FOR AERATING LIQUIDS WHICH TEND TO FROTH

SUMMARY OF THE INVENTION

An object of the present invention is to provide an apparatus for controlling froth in tanks for aerating liquids, for example, sewage coming from livestock establishments and charged with organic substances. An apparatus is provided comprising a blade wheel which is immersed in the liquid and to which air is supplied from above by way of a pipe coaxial to the blade wheel, while liquid is supplied to the latter from below. The air is mixed with the liquid forming the desired froth. A holder is provided in order to keep the inlet of the air pipe always at a distance above the level of liquid which corresponds approximately to the permissible thickness of the froth layer. Consequently the inlet of the air pipe will penetrate into the froth when the layer of froth grows beyond its permissible thickness, so that it is no longer air alone but partly froth — in some cases considerable amounts of froth and in the extreme case even froth alone — that is drawn in and fed to the blade wheel. Since frothing is proportionate to the aeration of the liquid, it is obvious that an apparatus of this kind has a self-regulating action.

BRIEF DESCRIPTION OF THE DRAWINGS

Examples of embodiments of the invention are illustrated diagrammatically in the accompanying drawings, in which:

FIG. 4 is a side view, partially in section, of a further embodiment of the apparatus of FIG. 1; and FIG. 5 is cross-sectional view of the apparatus of FIG. 4 along section lines II—II.

DETAILED DESCRIPTION OF A PREFERRED EMBODIMENT

Figure 1:
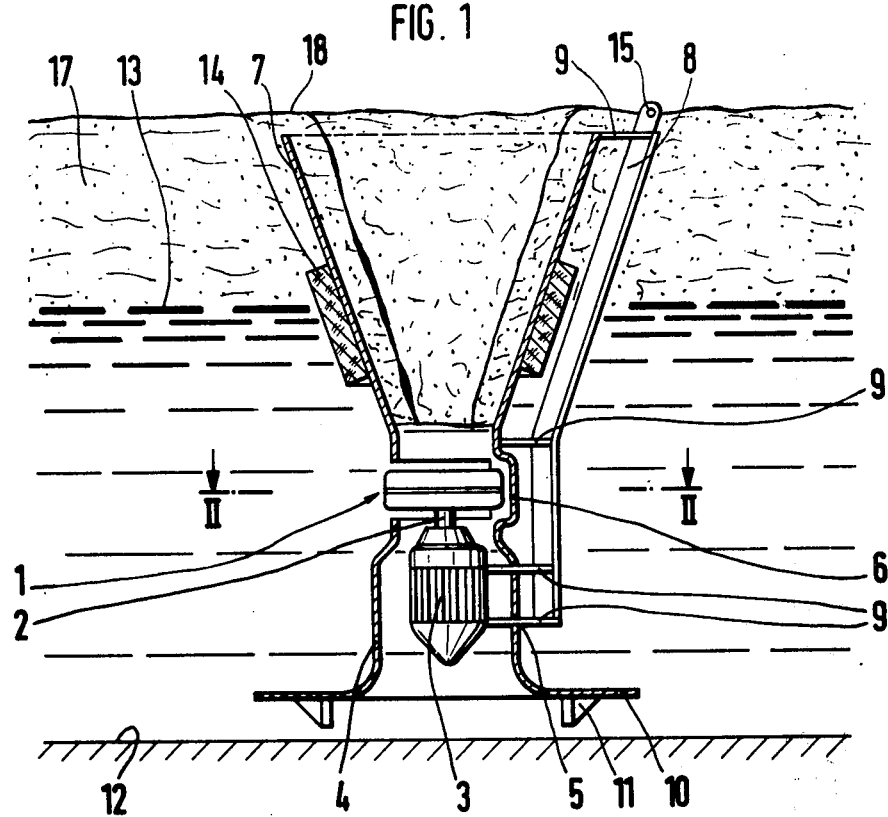
FIG. 1 is a side view, partially in section, of the aeration apparatus.

According to FIG. 1, the blade wheel 1 provided on both sides with blading is mounted on the shaft 2 of a submersible motor 3, which in turn is disposed inside a liquid pipe 4 having its mouth in the region of the lower side of the blade wheel and is fastened to the pipe 4 at 5. By means of a web 6 the liquid pipe 4 is joined to a funnel-shaped air pipe 7 whose lower end has its outlet in the region of the upper side of the blade wheel. The connection of the air pipe 7 — which hereinbelow will be referred to as "air funnel" for the sake of clarity — to the liquid pipe 4 is reinforced by a slightly angled support 8 of T-shaped cross-section, which is joined by webs 9 to the air funnel and liquid pipe. The bottom two webs serve to hold the motor 3. In this way a constructional unit is formed which comprises primarily the air funnel and the mounting of the blade wheel (obviously also including the drive motor 3), and in addition also the liquid pipe 4.

Figure 3:
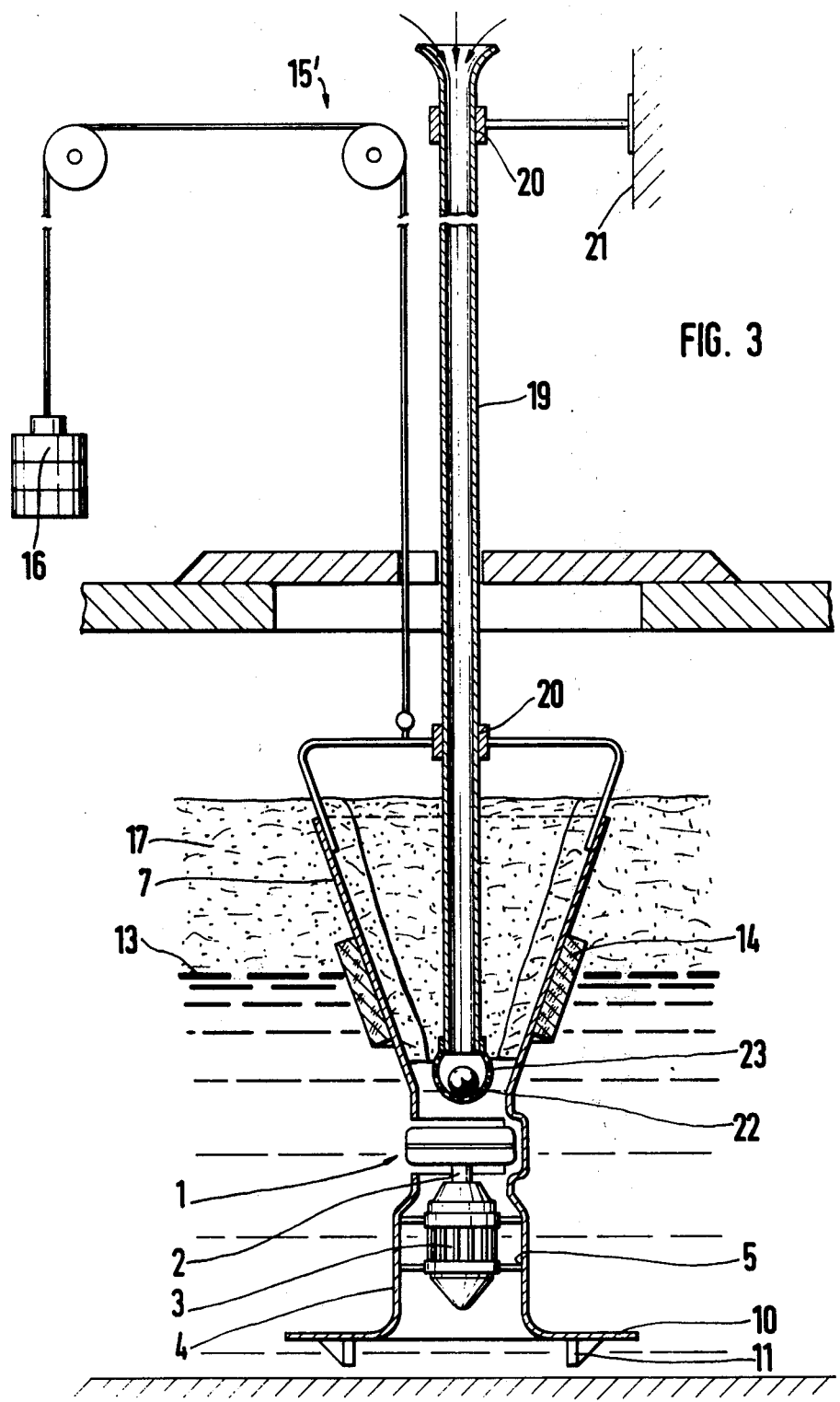
FIG. 3 is a side view, partially in section, of a further embodiment of the apparatus shown in FIG. 1.

At the bottom end of the liquid pipe is provided a disk-shaped extension 10 which on its lower side carries supports 11. The latter are intended to rest on the bottom 12 of the tank (not otherwise shown) in certain circumstances, for example when the amount of liquid contained therein is small. With a normal level of liquid in the tank — the level is indicated at 13 — this however is not the case, particularly because an annular float 14, that is to say a floating belt naturally also forms part of the holder of the apparatus. As is obvious, the latter must be secured against rotation. The necessity of measures serving this purpose is indicated in the form of a lug 15 at the end of the part 8. The other parts of the holder illustrated or described are also only given by way of indication, particularly as the holder may be modified in many respects. The only essential point is that it should fulfill its purpose of always keeping the inlet of the air funnel 7 at a distance above the liquid level 13 which corresponds approximately to the permissible thickness of the froth layer. Accordingly the holder may have other floats or, as shown in FIG. 3, may additionally (or optionally exclusively) be provided with a suspension given the general reference 15 and provided with a counterweight 16. It is obvious that one or more suspension springs could equally well be used, that is to say in general terms a suspension having a force storage means with an upwardly directed stored force. The floats and/or the suspension serve to hold the apparatus in equilibrium in the desired position. This equilibrium however is destroyed when the blade wheel is put into operation, since a downwardly directed force component occurs through the drawing-in of the liquid. This force component is however balanced through the fact that — in contrast to the stationary state — the air funnel is emptied and consequently acts itself as a part of the holder, namely as a buoyant body. For this reason alone it is advantageous — although not indispensable — for the air pipe to be in the form of a funnel.

The mode of operation of the apparatus can actually also be seen from what has been stated so far, and therefore will only be briefly recapitulated. When the layer of froth designated 17 in FIGS. 1 and 3 reaches its permissible thickness, that is to say the upper edge of the air funnel 7, froth enters through the inlet of the latter (see 18), passes to the blade wheel, and is mixed into the liquid again. In the present case, however, a regulating function is also combined with this action, since in proportion to the amount of foam mixed into the liquid a smaller amount of air can be mixed in. Thus the amount of frothing is thereby controlled. In the extreme case the air funnel 7 becomes full of froth, so that the supply of fresh air to the blade wheel is completely suppressed. This state continues until frothing declines and the layer of froth 17 is reduced.

In certain cases, for example in the case of closed tanks (see FIG. 3), it may be necessary on the one hand for a reduced amount of air still to be supplied to the blade wheel when the air funnel 7 has been filled with froth, and on the other hand to supply a certain amount of fresh air to the blade wheel in all circumstances. As already stated, this need may arise in the case of a closed tank owing to the fact that the tank space above the liquid is mainly filled with gases passing out of the latter. With this in mind the embodiment shown in FIG. 3 provides an auxiliary air pipe 19, which has one end in the region of the air intake side of the blade wheel and the other end in the atmosphere. As indicated at 20 and 21, the auxiliary air pipe may at the same time form part of a vertical guide arrangement for the apparatus. In order to avoid undesirable soiling of the auxiliary air pipe, it is advantageous to provide at its bottom end a check valve 23 with ball 22, which prevents liquid from rising in the pipe in the stationary state.

The embodiments illustrated are not only advantageous because of their self-regulating facility and therefore indirectly because of the intensive, optimum aeration achieved in the particular conditions prevailing, but also because of the arrangement of the motor driving the blade wheel in the liquid, particularly inside the liquid pipe 4, which forms around the drive motor an annular passage through which the liquid is fed to the blade wheel. The transfer of heat from the drive motor to the liquid results in a very substantial increase of the utilization of energy. This is also ensured with a low level of liquid, because the supports 11 disposed on the lower side of the disk-shaped extension 10 keep the inlet of the liquid pipe 4 free in all circumstances and at the same time prevent the extension 10 from adhering by suction to the bottom of the tank when the level of liquid is low.

Figure 2:
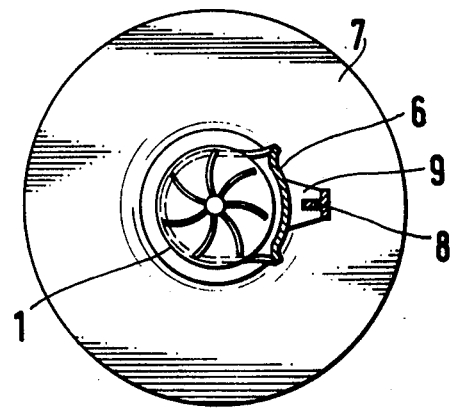
FIG. 2 is a section view of FIG. 1 along section line II—II.

Finally, mention should be made of the streamlined form of the connecting web 6 which can be seen in FIG. 2. Apart from the mechanical aspect, the purpose of this web is to prevent straw stalks and other foreign bodies, which have a tendency to coil up, from being caught on the part 8.

Reference has already been made above to numerous modifications which may be made. Here it will simply be added that in certain circumstances the air funnel 7 may not simply be provided with a floating belt but could itself be in the form of a floating body and made for example of expanded plastics material. The utilization of the submersible aerator in annular tanks, for example "oxidation pits", requires an additional conveyor action. This can be achieved by deflecting the outgoing jet of air-liquid mixture in a predetermined direction by means of a deflector plate.

The extent to which the air and liquid are mixed can in addition be substantially increased if the mixture flowing out of the rotor is guided over a certain distance in a turbulence tube 24 (see FIGS. 4 and 5). This tube allows a defined direction of flow to be achieved at the same time. The tube thus also serves for circulating the medium, for example in an elongated tank, or for example also for transporting the medium through a wall into a neighbouring tank or into the open. It is preferable for the turbulence tube to have its mouth in the lower third of the tank.

It is also conceivable for the conveying action to be switched on only intermittently, for example for emptying the tank.

The embodiments of the invention in which an exclusive property or privilege is claimed are defined as follows:

1. In a tank having a bottom containing a liquid with a varying surface level, an apparatus for aerating said liquid which tends to froth and for controlling the froth thickness in said tank, said apparatus comprising:
    rotating blade means, immersed in said liquid, for mixing air and said liquid forming a froth, said rotating blade means including an outlet;
    funnel-shaped air supply means for conducting air to said blade means, said air supply means coaxially located above said rotating blade means and having a buoyancy means for automatically maintaining an inlet to said air supply means a predetermined distance above said varying surface level, said distance corresponding to a desired froth thickness said funnel-shaped air supply means further having a wide portion of said funnel-shape defining said inlet; and
    liquid supply means for conducting said liquid to said blade means.

2. The apparatus of claim 1 wherein said apparatus further includes holder means for joining said rotating blade means, said air supply means, and said liquid supply means into an integral unit, said integral unit including means for permitting vertical but not rotational movement of the unit.

3. The apparatus of claim 2 wherein said liquid supply means is coaxial with said air supply means and said rotating blade means is disposed therebetween, said liquid supply means further including a liquid inlet means, immersed in said liquid, for directing liquid into said liquid supply means, said liquid inlet means comprising a further portion of said integral unit.

4. The apparatus of claim 3 wherein said rotating blade means comprises:
    blade wheel means for mixing said liquid with air forming froth upon rotation; and
    drive motor means for rotating said blade wheel means, said motor means disposed within and supported by said liquid supply means.

5. The apparatus of claim 4 wherein said liquid inlet means includes support means for maintaining said apparatus in a spaced relationship away from said tank bottom.

6. The apparatus of claim 5 wherein said liquid inlet means comprises a generally bell-shaped housing in coaxial alignment with said liquid supply means, said housing including extensions protruding therefrom and spacing said housing away from said tank bottom.

7. The apparatus of claim 1 wherein said flotation means comprises a floating belt disposed around said funnel-shaped housing.

8. The apparatus of claim 7 wherein said air supply means further includes an auxiliary air intake for continually supplying a predetermined quantity of air to said rotating blade means.

9. The apparatus of claim 8 wherein said auxiliary air intake forms a vertical guide for said apparatus.

10. The apparatus of claim 8 wherein said air supply means further includes check valve means for preventing flow of said liquid into said auxiliary air intake.

11. The apparatus of claim 1 wherein said rotating blade means includes guide means, attached to said outlet for directing said froth away from said apparatus.

12. The apparatus of claim 11 wherein said guide means comprises a turbulence pipe.

13. The apparatus of claim 12 wherein said turbulence pipe has an outlet located in a lower third of said tank.

14. The apparatus of claim 1 wherein said apparatus further includes a counterweight means for offsetting at least a portion of the weight of said integral unit.

* * * * *